United States Patent [19]

Lockhart

[11] Patent Number: 4,837,936
[45] Date of Patent: Jun. 13, 1989

[54] UNDERWATER MEASURING GAGE

[75] Inventor: James L. Lockhart, Pocatello, Id.

[73] Assignee: The United States of America as represented by The United States Department of Energy, Washington, D.C.

[21] Appl. No.: 126,157

[22] Filed: Nov. 30, 1987

[51] Int. Cl.[4] .................. G01B 5/08; G21C 17/00
[52] U.S. Cl. .................. 33/783; 33/178 E; 33/502; 376/245
[58] Field of Search ............ 33/143 R, 143 L, 143 E, 33/143 F, 147 N, 147 J, 147 T, 147 F, 147 H, 158, 502, 178 R, 178 E; 376/245, 249

[56] References Cited

U.S. PATENT DOCUMENTS

| 1,617,005 | 2/1927 | Ames | 33/147 J |
| 3,038,259 | 6/1962 | Smialowski et al. | 33/143 R |
| 3,987,552 | 10/1976 | Raiteri | 33/143 L |
| 4,196,048 | 4/1980 | Qurnell et al. | 376/245 |
| 4,253,240 | 3/1981 | Feichtinger | 33/178 E |
| 4,420,455 | 12/1983 | Qurnell et al. | 376/245 |

FOREIGN PATENT DOCUMENTS 2158277 6/1972 Fed. Rep. of Germany .... 33/178 E

Primary Examiner—William A. Cuchlinski, Jr.
Assistant Examiner—Patrick R. Scanlon
Attorney, Agent, or Firm—William W. Randolph; Judson R. Hightower; Richard E. Constant

[57] ABSTRACT

A device for remotely measuring the diameter of wire rope. The device includes a linear variable differential tansducer, a mechanism to guide and clamp the rope in relation to the anvil of the transducer, an elongated handle for manually manipulating the transducer and the guide and clamp mechanism.

15 Claims, 2 Drawing Sheets

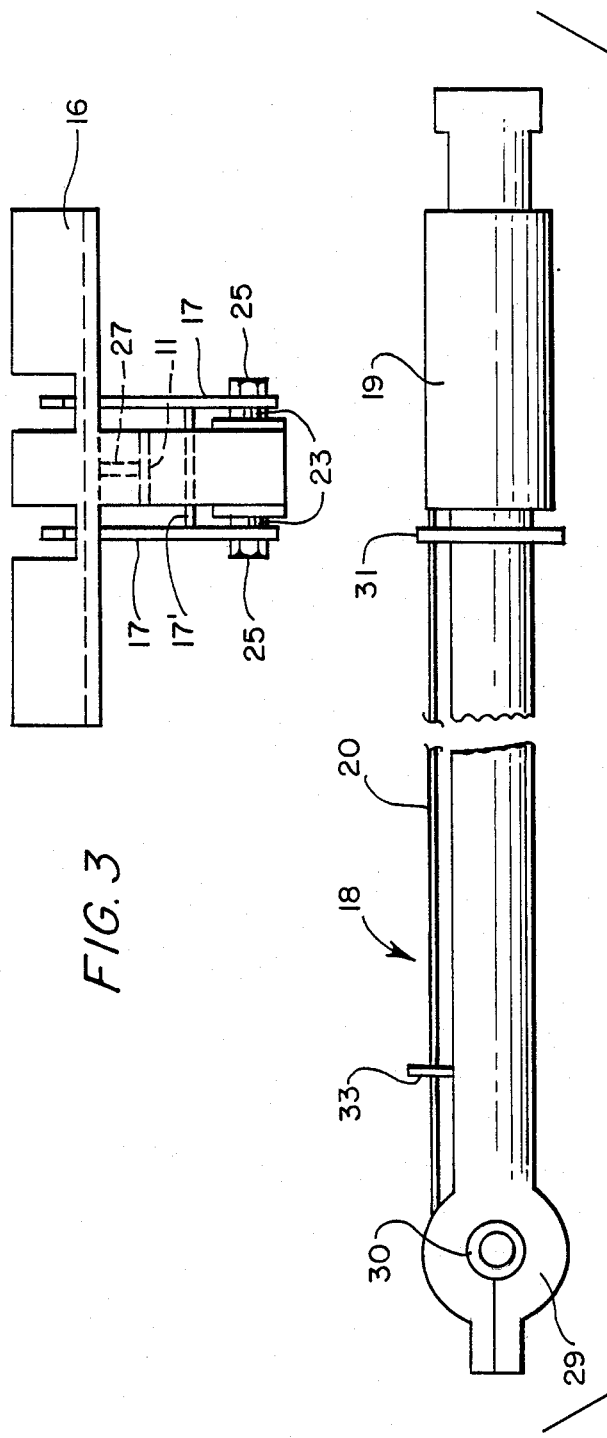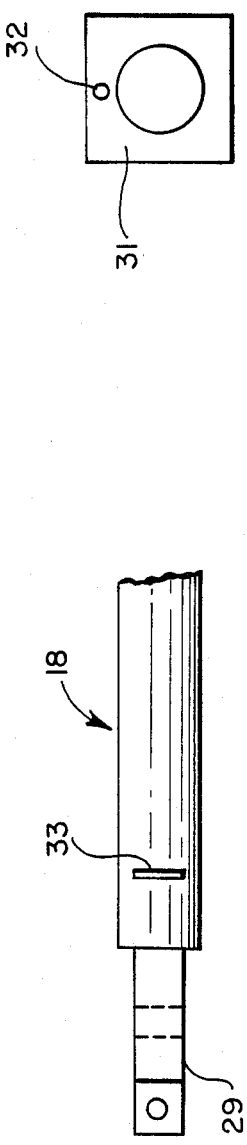

UNDERWATER MEASURING GAGE

BACKGROUND OF THE INVENTION

The present invention relates to in-service measurement of dimensions of radioactively contaminated objects and more particularly to a measuring device for measuring the diameter of wire rope from a remote postion.

DESCRIPTION OF THE PRIOR ART

Nuclear power installations are known to make monthly or other periodic inspections of wire ropes which are used for various devices such as elevators, hoists and transfer carts which are located in radioactively contaminated water. The periodic inspections consists of measurement of the diameter of the wire rope at numerous different locations. For example, at least ten different locations can be measured at one taking. It is known in the prior art to make the measurements of the wire rope diameters by use of a conventional hand-held caliper. However, this sometimes requires the operator to work in unsafe working positions as well as placing the operator physically close to the contaminated wire rope.

Calipers of conventional design are also well-known in the prior art. Such a conventional measuring device is shown in U.S. Pat. No. 4,550,506 to Katayama. This prior art patent generally describes a conventional measuring device which is generally provided with a stationary measuring contact point and a movable measuring contact point positioned so as to oppose the stationary contact point. In this prior art device, a sliding member in the form of a spindle carries the movable contact point and a guiding member guides the spindle to make the movable measuring contact point approach or back away from the object being measured.

Another example of a known device for perfoming desired measurements on radioactive contaminated reactor components is shown in U.S. Pat. No. 4,196,048 to Franklin D. Qurnell et al. This patent shows a remotely-operable eddy-current technique for remotely measuring the formation of corrosion on a radioactive component.

It should be apparent from the above that a measuring device which allows a worker to make wire rope diameter or other measurements remotely would be of benefit, would reduce radiation exposure and provide safer working conditions.

SUMMARY OF THE INVENTION

Accordingly, one object of the present invention is to provide a measuring device which allows a worker to make remote diameter measurements of wire rope or other objects in a contaminated environment.

It is still another object of the present invention to use a conventionally available linear variable displacement transducer to perform wire rope measurements electronically.

It is still a further object of the present invention to provide a measuring device which is relatively inexpensive to fabricate and which is safe in operation.

According to another aspect of the present invention I provide a measuring device for measuring the diameter of rope wire or the like. The device comprises a baseplate and a linear variable displacement transducer ("LVDT") having a reciprocable anvil. Guide means are attached to the baseplate for guiding a wire rope into the desired position relative to the anvil of the LVDT for measurement of the diamenter. The guide means includes a rigid plate opposed to the anvil. Furthermore, the device comprises clamping jaw means which are mounted on the baseplate for clamping the wire rope into position in the guide means. In addition, an elongated handle is attached to the baseplate and the remote end of the handle is adapted for manual manipulation by a worker to position the anvil and guide means relative to the wire rope. Also, a movable handle is mounted on the remote end of the handle means. The movable handle is connected to the clamping jaw means by connection means whereby the jaw means can be manually moved out of its wire rope-clamping position when the operator desires to position the anvil and guide means adjacent to a wire rope or portion thereof for another diameter measurement.

It should be understood that other objects and advantages of the present invention will be readily appreciated by reference to the following detailed description when considered in connection with the accompanying drawings.

DESCRIPTION OF THE DRAWINGS

FIG. 3 is a partial end view of the embodiment shown in FIG. 1.

FIG. 5 is a top view of one embodiment of an elongated handle according to the present invention.

FIG. 6 is a partial side view of the handle depicted in FIG. 5.

FIG. 7 is a detailed view of an element depicted in FIG. 5.

DESCRIPTION OF THE PREFERRED EMBODIMENT

Figure 2:
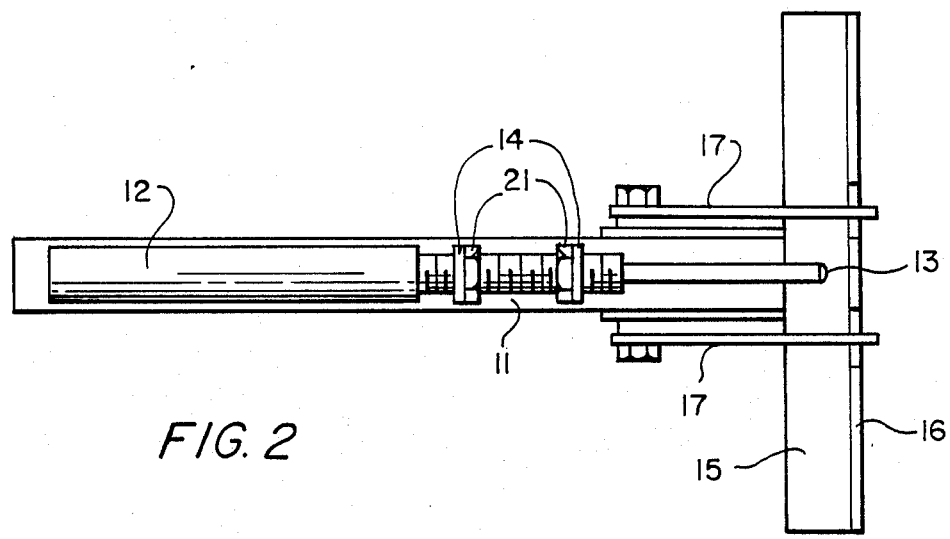
FIG. 2 is a partial top view of the same embodiment.
Figure 1:
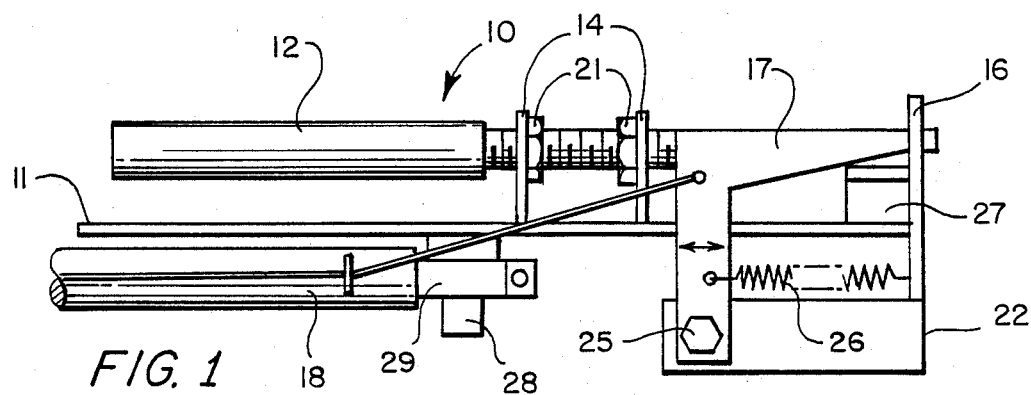
FIG. 1 is a partial side view of one embodiment of the present invention with portions of the elongated handle broken away.
Figure 4:
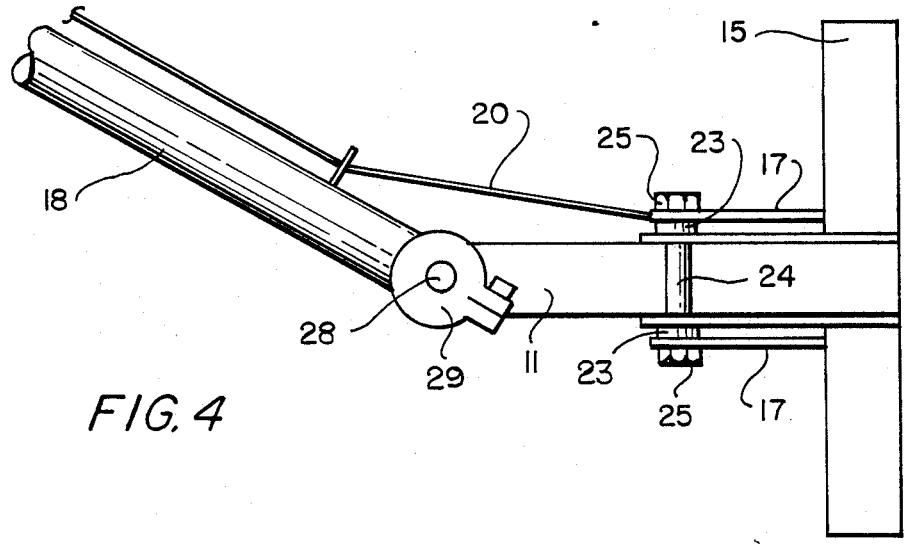
FIG. 4 is a partial bottom view of the embodiment of FIG. 1.

In the drawings, like numbers are applied to like parts for ease of description. FIGS. 1-5 are referred to for a brief overall description of one embodiment of the present invention. In the figures, a measuring device 10 is depicted. The measuring device comprises a flat baseplate 11 as best seen in FIGS. 1-4. A linear variable displacement transducer ("LVDT") 12 is supported on two LVDT holder brackets 14 which are attached to the baseplate 11. The LVDT has a reciprocable anvil 13, as best seen in FIG. 2, which moves to and fro along the axis of the LVDT. The measuring device 10 also comprises guide means 15 attached to one end of the baseplate 11 as best seen in FIG. 2. Guide means 15 is adapted for guiding a wire rope to be measured into a position relative to the anvil 13 for measurement of the diameter of the wire rope. The guide means 15 includes a rigid plate 16 which is opposed to the anvil 13. The measuring device 10 also comprises clamping jaws 17 which are mounted on the baseplate 11 for clamping the wire rope into position in the guide means 15. An elongated handle means 18, as best seen in FIG. 5, has one end attached to the baseplate 11 as seen in FIGS. 1 and 4. The other end of handle means 18 is adapted for remote manipulation of the baseplate 11 and the attached anvil 13 and wire guide means 15 relative to the wire rope. As best seen in FIG. 5, movable handle means 19 is mounted adjacent to the other end of handle means 18. The movable handle 19 is slidably mounted on the outside of handle means 18 and is connected to the clamping jaws 17 by connection means 20 such as stainless steel wire. Movable handle means 19 can be used by the worker to move the jaws 17 out of their wire rope-clamping position which is shown in FIG. 1, to an open position when it is desired to position the anvil 13 and guide means 15 adjacent to a wire rope for reclamping prior to another diameter measurement reading using the LVDT.

Referring in more detail to FIGS. 1 through 4 of the drawings, the embodiment depicted uses an elongated metal baseplate 11 which has attached LVDT holder brackets 14 extending upwardly from the surface of the baseplate. As seen in the drawings, a threaded portion of the LVDT is held by nuts 21 to these holder brackets 14. The LVDT 12 is a commercially-available device and has a movable anvil 13 as best seen in FIG. 2. In the specific embodiment described, the LVDT is commercially available as Model No. GPA-121-500 from Schaevitz. One end of baseplate 11, the device has a guide means 15 comprising, in part, a rigid elongated plate 16 which is mounted mutually perpendicular to the axis and surface of the base plate 11. Also attached to the same end of baseplate 11, is a clamping jaw support bracket 22 which is situated below baseplate 11 and provides a pivotal axis for one end of the clamping jaws 17. L-shaped clamping jaws 17 are pivotally mounted on a threaded bar which extends through holes in the clamping jaws 17 and the clamping jaw support brackets 22. As best seen in FIGS. 3 and 4, the clamping jaws are spaced on the threaded bar by means of short spacer tubes 23 and a relatively long spacer tube 24. The nuts 25 threaded on each end of the threaded bar are used to fasten each clamping jaw 17 for pivotal movement. As seen in FIG. 3, jaws 17 are connected to one another by brace 17' so that they can be simultaneously pivoted toward and away from plate 16 in a manner to be described.

An extension spring 26 is connected to one leg of the clamping jaw 17 as best seen in FIG. 1. The other end of the spring 26 is attached to plate 16 to provide suitable tension to the spring.

As best seen in FIGS. 1 and 3, the device is provided with a wire guide brace 27 connected to one end of baseplate 11 on the one hand and to underside of guide means 15, on the other hand.

As best seen in FIGS. 1 and 4, baseplate 11 has an attached stud 28 for the attachment of the end of handle 18. Stud 28 is cylindrical so that the joint 29 with handle 18 provides an opportunity for pivotal adjustment of the handle relative to the baseplate 11. As described in more detail, wire 20, partially shown in FIGS. 1 and 4, extends along the exterior of handle 18 and is connected at one end to the clamping jaw 17, as best seen in FIG. 1. Thus, it should be apparent that wire 20 can be used to pivot the clamping jaw 17 in a counter-clockwise direction against the force of extension spring 26 as shown in FIG. 1.

FIGS. 5, 6 and 7 depict the details of the elongated handle 18 which is attached to the baseplate 11 as best seen in FIGS. 2 and 4. In FIG. 5, handle 18 is constructed of stainless steel pipe. One end of the pipe has a enlarged circular portion 29 into which a brass bushing 30 is fitted. As best seen in FIG. 6, the extreme end of portion 29 is provided with a through hole and slit so that a bolt can be used to tighten the brass bushing about the handle stud 28 as shown in FIGS. 1 and 4. At the other end of handle 18, there is provided a movable handle 19 made of a larger diameter stainless steel pipe. Handle 19 is designed to be manually moved to and fro along the outside of pipe handle 18 between stops. FIG. 7 is a detailed showing of one of the stops 31 which is rigidly attached to the exterior of handle 18 as best seen in FIG. 5. The other stop is on the very outer end of handle 18 but it is not shown in any detail since its construction is conventional. As best seen in FIG. 7, the stop 31 is rectangular in shape and has a smaller wire guide hole 32 which is used to guide the wire 20 as will be described. Adjacent to the other end of handle 18 is a washer or other similar guide 33 for the portion of wire 20 that extends therethrough. As described above, one end of wire 20 is attached to a clamping jaw 17 and the other end of wire 20 is attached to the movable steel pipe handle 19. The intervening portions of wire 20 are guided by the holes in guides 31 and 33.

Although not shown in the drawings, it should be understood that the LVDT is connected by suitable electrical connectors to an external meter and/or display device which is of convential construction. Typically, such an exterior device will digitally show the amount of distance separating the movable anvil 13 of the LVDT and the opposing surface of rigid plate 16 of the guide means 15. The electronic aspects do not form any part of the claimed invention and they are therefore not described further nor illustrated.

To operate the above-described measuring device, the slidably movable handle 19 is pulled toward the remote end of the handle 18 by the operator. This tensions wire 20 causing the opening of the clamping jaws 17 against the counteractive force of the spring 26. After the clamping jaws 17 are opened, a wire rope is positioned under the jaws. As the wire rope is slid into the guiding means 15 against the rigid plate 16, the exterior of the wire rope contacts a taper on anvil 13, forcing the anvil and the associated core of the LVDT to retract. The direction of retraction is to the left and away from rigid plate 16 as best seen in FIG. 2. Wire rope is thus placed between the anvil 13 and the rigid plate 16 of the guide means 15. The operator then releases the tension on the slidably movable handle 19 and the clamping jaws 17 are closed under the action of the spring 26. The wire rope is thus securely held in place by the clamping jaws and guide means. The diameter of the wire rope is displayed on the electric readout device which may be a digital display and is previously calibrated using standards of known diameter objects.

The preferred embodiment is constructed of various stainless steel components unless otherwise required. The specific embodiment disclosed was dimensioned so that the elongated handle 18 would be approximately five feet long with the handle 18 being made of 0.5 inch, Schedule 40 304 stainless steel pipe.

While a preferred embodiment of the invention has been shown and described, it will be apparent to those skilled in the art that modifications can be made within the scope of the invention which is defined in the appended claims. Accordingly, the foregoing embodiment is to be considered illustrative only, rather than restricting the invention and those modifications which come within the meaning and range of equivalency of the claims are to be included herein.

What is claimed is:

1. A measuring device comprising:

a base; a linear variable displacement transducer having a reciprocable anvil; means supporting said transducer on said base; guide means attached to said base for guiding an object to be measured into position relative to said anvil for measurement of said object; clamping jaw means pivotally mounted on said base for clamping said object into position in said guide means; elongated handle means with one end attached to said base and the other end thereof adapted for remote manual manipulation of said anvil and guide means relative to said object, and a movable handle means mounted adjacent said other end of said handle means, said movable handle means being connected to said clamping jaws means by connection means whereby said jaw means can be moved out of its object-clamping position when it is desired to position said anvil and guide means adjacent an object for another measurement.

2. The invention of claim 1 wherein said base comprises a member in the form of a flat elongated rectangular baseplate having a first and second end.

3. The invention of claim 2 wherein said linear variable displacement transducer is in the form of an elongated cylindrical object, the longitudinal axis thereof is oriented form said first to said second end of said baseplate, and said anvil is oriented adjacent said second end.

4. The invention of claim 3 wherein said guide means comprises a rigid plate in the form of a flat elongated rectangular plate, said rigid plate is oriented mutually perpendicular to said baseplate and is mounted adjacent to said second end of said baseplate.

5. The invention of claim 1 wherein said clamping jaw means is pivotally mounted on said base so as to be adapted to pivot toward and away from said object.

6. The invention of claim 1 wherein said clamping jaw means is resiliently biased toward said object-clamping position by spring means connected to said jaw means.

7. The invention of claim 1 wherein said elongated handle means is rotatably mounted on said base.

8. The invention of claim 1 wherein said movable handle means is slidably mounted on said elongated handle means and said connection means comprises a flexible wire extending from said movable handle means to said clamping jaw means.

9. A measuring device comprising:
a baseplate; a linear variable displacement transducer having a reciprocable anvil; means supporting said transducer on said baseplate; elongated guide means attached to said baseplate for guiding wire rope to be measured into position relative to said anvil for measurement of the diameter of said wire rope; clamping jaw means pivotally mounted on said baseplate for clamping said wire rope into position in said guide means; elongated handle means with one end pivotally attached to said baseplate and the other end adapted for remote manual manipulation of said anvil and guide means relative to said wire rope, a movable handle means mounted adjacent said other end of said handle means, said movable handle means being connected to said clamping jaw means by connection means whereby said jaw means can be moved out of its wire rope-clamping position when it is desired to position said anvil and guide means adjacent to a wire rope for another measurement.

10. The invention of claim 9 wherein said baseplate comprises a member in the form of a flat elongated rectangular baseplate having a first and second end.

11. The invention of claim 10 wherein said linear variable displacment transducer is in the form of an elongated cylindrical object, the longitudinal axis thereof is oriented from said first to said second end of said baseplate, and said anvil is oriented adjacent said second end.

12. The invention of claim 11 wherein said guide means comprises a rigid plate in the form of a flat elongated rectangular plate, said rigid plate is oriented mutually perpendicular to said baseplate and is mounted adjacent to said second end of said baseplate.

13. The invention of claim 9 wherein said clamping jaw means is pivotally mounted on said baseplate so as to be adapted to pivot toward and away from said wire rope.

14. The invention of claim 9 wherein said clamping jaw means is resiliently biased toward said object clamping position by spring means connected to said jaw means.

15. The invention of claim 9 wherein said movable handle means is slidably mounted on said elongated handle means and said connection means comprises a flexible wire extending from said movable handle means to said clamping jaw means.

* * * * *